(12) United States Patent
Smith et al.

(10) Patent No.: US 6,640,657 B1
(45) Date of Patent: Nov. 4, 2003

(54) FIXTURE FOR SUPPORTING A SENSING DEVICE ON A MOVABLE ARTICLE

(75) Inventors: Jeffrey M. Smith, Sylvania, OH (US); Blake T. Garretson, Liberty Center, OH (US); Jeremy A. Rapp, Toledo, OH (US); Matthew R. White, Sylvania, OH (US)

(73) Assignee: Torque-Traction Technologies, Inc., Holland, OH (US)

( * ) Notice: Subject to any disclaimer, the term of this patent is extended or adjusted under 35 U.S.C. 154(b) by 127 days.

(21) Appl. No.: 10/017,904

(22) Filed: Dec. 14, 2001

(51) Int. Cl.$^7$ .............................................. G01D 11/00
(52) U.S. Cl. ................................................... 73/866.5
(58) Field of Search ............................... 73/866.5, 431, 73/862.191

(56) References Cited

U.S. PATENT DOCUMENTS

| | | | |
|---|---|---|---|
| 3,309,710 A | * 3/1967 | Smoot et al. | 346/49 |
| 3,396,576 A | * 8/1968 | Anderson | 73/862.191 |
| 4,302,757 A | 11/1981 | Still | 340/854 |
| 4,388,710 A | 6/1983 | Pecon, Jr. | 367/134 |
| 4,400,858 A | 8/1983 | Goiffon et al. | 138/108 X |
| 4,403,218 A | 9/1983 | Beal et al. | 340/870.18 |
| 4,754,652 A | 7/1988 | Coulter et al. | 73/862.19 |
| 4,982,101 A | 1/1991 | Baker | 250/551 |
| 4,995,248 A | * 2/1991 | Liu | 70/107 |
| 5,003,260 A | 3/1991 | Auchterlonie | 324/207.16 |
| 5,262,717 A | 11/1993 | Bolegoh | 73/862.336 X |
| 5,610,346 A | * 3/1997 | Stelts | 73/866.5 |
| 6,057,762 A | 5/2000 | Dusza | 340/568.6 |
| 6,437,703 B1 | * 8/2002 | Fong | 340/689 |

FOREIGN PATENT DOCUMENTS

EP 974818 A1 * 1/2000 ........... G01F/23/40

* cited by examiner

Primary Examiner—Thomas P. Noland
(74) Attorney, Agent, or Firm—MacMillan, Sobanski & Todd, LLC

(57) ABSTRACT

A fixture for supporting a sensing device on a variety of differently sized and shaped articles and for protectively enclosing such a sensing device when the article is moved during use includes a base including a pair of spaced apart feet that engage the outer surface of the article. The feet defined a recessed area in the bottom surface of the base that can receive portions of the article therein regardless of the radius of curvature or other shape thereof. An enclosure area is provided in the base that can receive a sensing device therein. A lid cooperates with the base to provide a protective enclosure for the enclosed area and the sensing device disposed therein. The lid can be retained on the base by any desired retaining structure. A seal can be provided between the lid and the base to prevent dirt, water, and other contaminants from entering into the enclosed area when the lid cooperates with the base. A counterweight can be supported on the outer surface of the article opposite to the base to reduce or eliminate any rotational imbalance in the article that would otherwise occur if only the base, the lid, and the sensing device were secured thereto.

31 Claims, 3 Drawing Sheets

FIXTURE FOR SUPPORTING A SENSING DEVICE ON A MOVABLE ARTICLE

BACKGROUND OF THE INVENTION

This invention relates in general to a device that is supported on a movable article for the purpose of sensing one or more operating characteristics of such article as it is moved during use. In particular, this invention relates to a fixture for quickly and easily supporting such a sensing device, or a portion thereof, on a variety of differently sized and shaped articles and for protectively enclosing such a sensing device when the article is moved during use.

Many mechanical systems include one or more articles that are physically moved in some manner during use. For example, a torque transmitting shaft assembly is commonly used for transferring rotational power from a source of rotational power to a rotatably driven mechanism. One example of a torque transmitting shaft assembly is a vehicular driveshaft assembly that provides a rotatable driving connection between an output shaft of a vehicle transmission that is driven by the vehicle engine and an input shaft of an axle assembly for rotatably driving the vehicle wheels. To accomplish this, a typical vehicle driveshaft assembly includes a hollow cylindrical driveshaft tube having a pair of end fittings secured to the opposite ends thereof. The end fittings are usually embodied as tube yokes that support respective cross members thereon. The cross members cooperate with respective end fittings provided on the output shaft of the transmission and the input shaft of the axle assembly to form respective universal joint assemblies. Such universal joint assemblies provide a rotatable driving connection between the output shaft of the vehicle transmission, the driveshaft tube, and the input shaft of an axle assembly, even though the rotational axes of these three members are usually not co-axially aligned during use.

In mechanical systems of this general type, it is sometimes necessary or desirable to sense one or more operating characteristics of the article as it is moved during use. For example, in the context of the above-described vehicular driveshaft assembly, it may be desirable to sense the magnitude of the torque that is applied to the driveshaft tube during operation. The operating characteristics that are sensed can be evaluated to generate a variety of useful information, such as determining the life span of the article, points of anticipated fatigue or failure on the article, the amount of usage of the article, and other performance-related information.

The sensing of the operating characteristics of the movable article usually involves providing one or more sensors on or adjacent to the article as it is moved during use. The sensors generating signals that are representative of the operating characteristics desired to be sensed. The operating characteristic signals from the sensors can either be stored in a storage device for subsequent retrieval and evaluation or be transmitted by a telemetry device to a remote controller for storage and/or evaluation.

In some instances, the various sensors, storage devices, and telemetry devices are permanently secured to the article being studied. However, in other instances, it is undesirable to permanently secure such structures to the article being studied. To address this, it is known to provide a fixture for temporarily supporting such a sensing device, or a portion thereof, on the article during the period of time when it is desired to sense the operating characteristics thereof. However, because the articles themselves may vary widely in size and shape, it has been necessary in the past to provide a variety of differently sized and shaped fixtures for temporarily supporting the sensing devices thereon. Although effective, the provision of such a variety of differently sized and shaped fixtures has been found to be relatively cost ineffective.

Thus, it would be desirable to provide a single fixture for quickly and easily supporting a sensing device, or a portion thereof, on a variety of differently sized and shaped articles and for protectively enclosing such a sensing device when the article is moved during use.

SUMMARY OF THE INVENTION

This invention relates to a fixture for quickly and easily supporting a sensing device, or portion thereof, on a variety of differently sized and shaped articles and for protectively enclosing such a sensing device when the article is moved during use. The fixture includes a base including a pair of spaced apart feet having respective inner surfaces that engage the outer surface of the article. The spaced apart feet defined a recessed area in the bottom surface of the base that can receive, and thereby accommodate, portions of the article therein regardless of the radius of curvature or other shape thereof. An enclosure area is provided in the base that can receive and retain a sensing device. The fixture further includes a lid that cooperates with the base to provide a protective enclosure for the enclosed area and the sensing device disposed therein. The lid can be retained on the base by any desired retaining structure. If desired, a seal can be provided between the lid and the base to prevent dirt, water, and other contaminants from entering into the enclosed area when the lid cooperates with the base. A counterweight can be supported on the outer surface of the article opposite to the base to reduce or eliminate any rotational imbalance in the article that would otherwise occur if only the base, the lid, and the sensing device were secured thereto.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
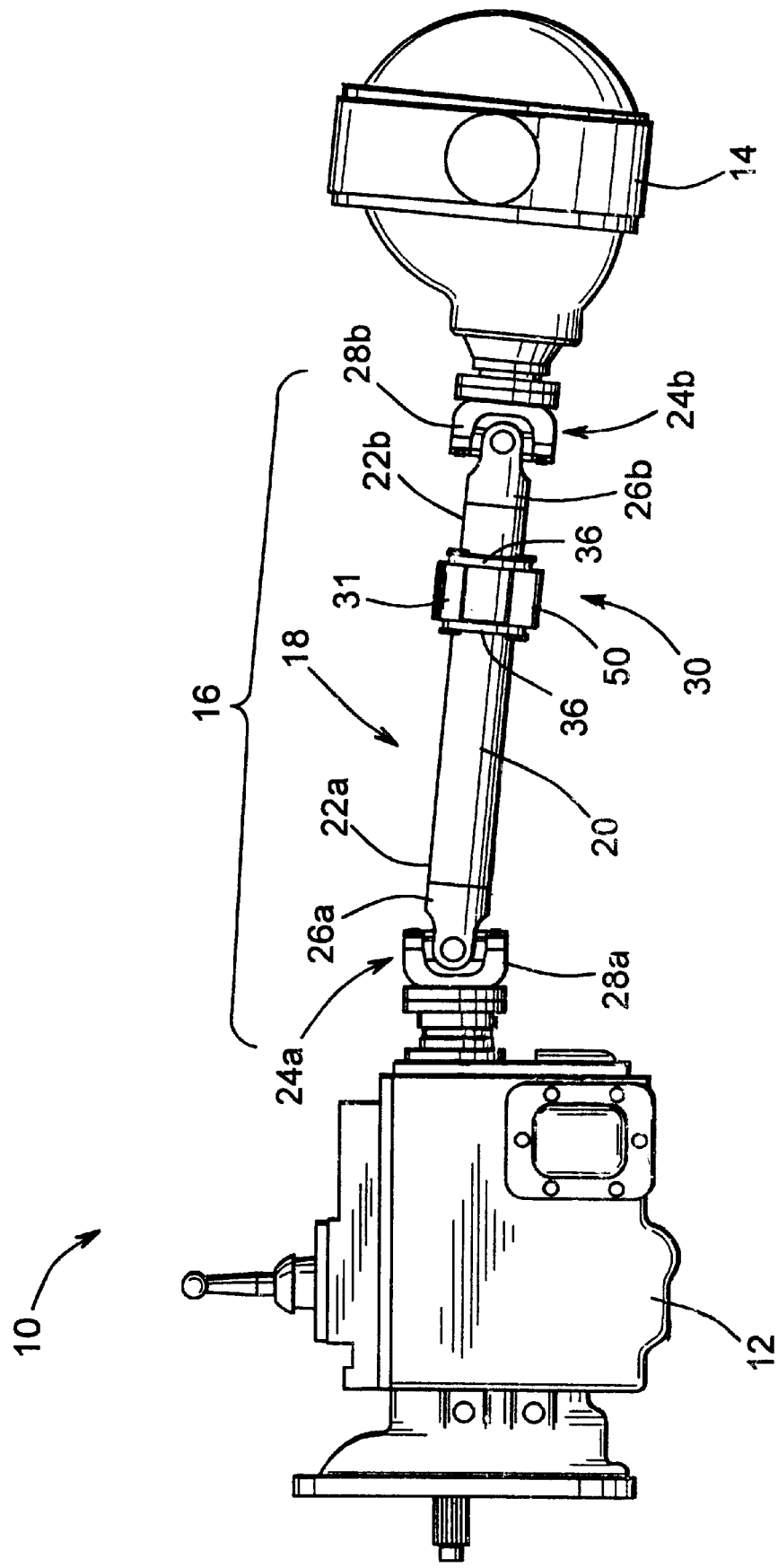
FIG. 1 is a side elevational view of a vehicular driveshaft assembly including a fixture for supporting a sensing device on a driveshaft tube in accordance with this invention.

Referring now to the drawings, there is illustrated in FIG. 1 a vehicle drive train assembly, indicated generally at 10, that is generally conventional in the art. The illustrated drive train assembly 10 includes a transmission 12 having an output shaft (not shown) that is connected to an input shaft (not shown) of an axle assembly 14 through a driveshaft assembly 16. The transmission 12 is rotatably driven by an engine (not shown) or other source of rotational power in a conventional manner. The driveshaft assembly 16 includes a cylindrical driveshaft tube, indicated generally at 18, having a center portion 20 and a pair of opposed end portions 22*a* and 22*b*. In the illustrated embodiment, the center portion 20 of the driveshaft tube 18 is formed having the same outer diameter as the end portions 22a and 22b. However, if desired, the center portion 20 of the driveshaft tube 18 may be formed having a larger outer diameter than either of the end portions 22a and 22b or any other desired shape. Alternatively, the single driveshaft tube 18 may be replaced by a compound driveshaft as assembly (not shown) having separate first and second driveshaft sections that are supported by a center bearing assembly (not shown) between the transmission 12 and the axle assembly 14. The driveshaft tube 16 can be formed from any suitable material, such as a lightweight aluminum alloy (6061 alloy, for example).

The rotational axes of the output shaft of the transmission 12 and the input shaft of the axle assembly 14 are typically not co-axially aligned. To accommodate this, a pair of universal joints, indicated generally at 24a and 24b, are provided to respectively connect the end portions 22a and 22b of the driveshaft tube 18 to the output shaft of the transmission 12 and to the input shaft of the axle assembly 14. The first universal joint 24a includes a tube yoke 26a that is secured to the forward end portion 22a of the driveshaft tube 18 by any conventional means, such as by welding or adhesives. The first universal joint 24a further includes a half round end yoke 28a that is connected to the output shaft of the transmission 12. The second universal joint 24b includes a tube yoke 26b that is secured to the rearward end portion 22b of the driveshaft tube 18 by any conventional means, such as by welding or adhesives. The second universal joint 24b further includes a half round end yoke 28b that is connected to the input shaft of the axle assembly 14. The structure of the driveshaft assembly 16 thus far described is conventional in the art and forms no part of this invention.

A mounting fixture, indicated generally at 30, is supported on the outer surface of the driveshaft tube 18 for rotation therewith. Although the fixture 30 of this invention will be described in the context of the illustrated vehicular drive train assembly 10, it will be appreciated that the fixture 30 may be utilized in conjunction with any other article for which it is desired to measure or otherwise sense one or more operating characteristics of such article during use. Thus, the scope of this invention is not intended to be limited to the specific structure of the illustrated vehicular driveshaft assembly 10 or to driveshaft assemblies in general.

Figure 2:
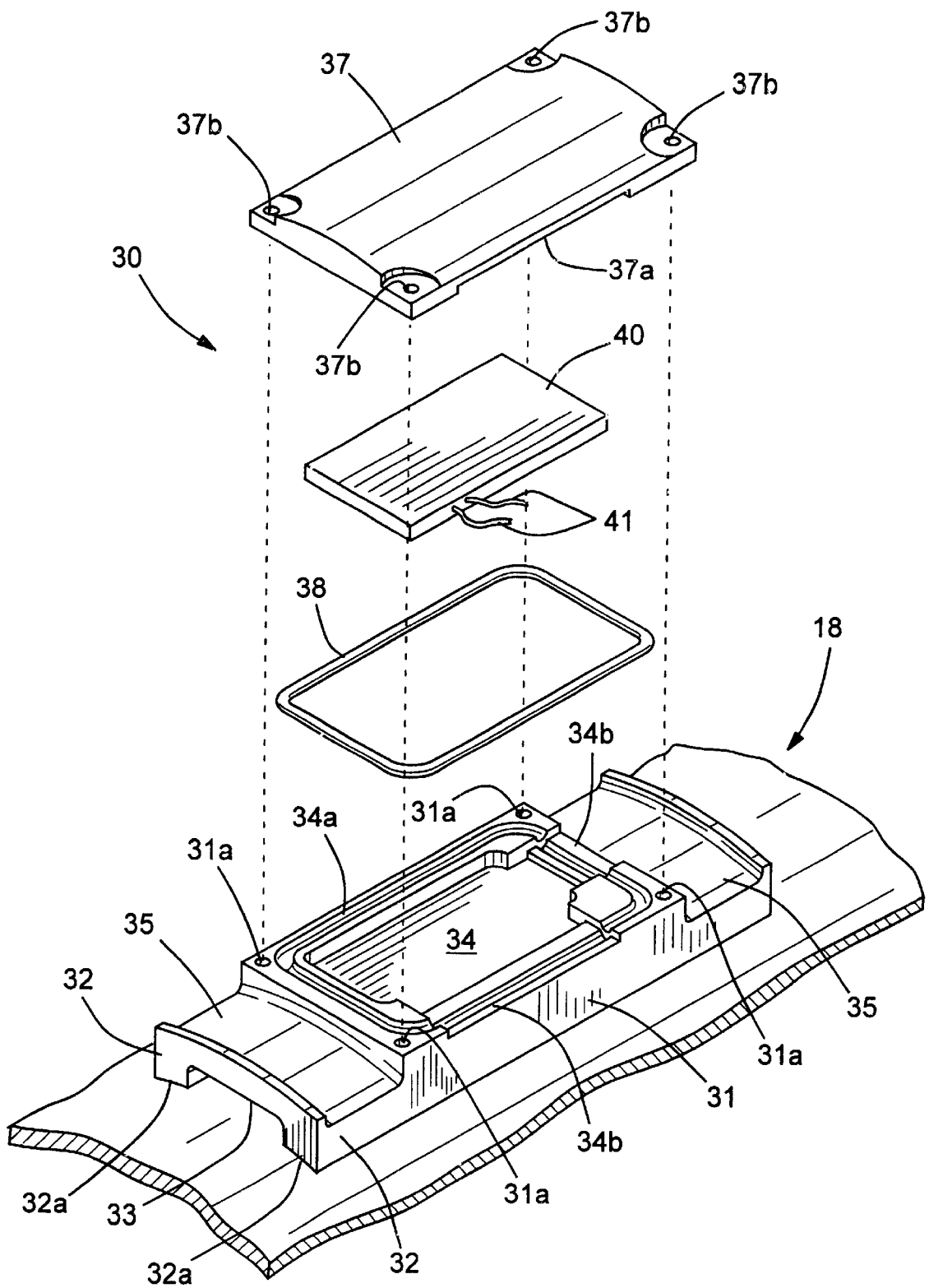
FIG. 2 is an enlarged exploded perspective view of portions of the driveshaft tube, the fixture, and the sensing device illustrated in FIG. 1.
Figure 3:
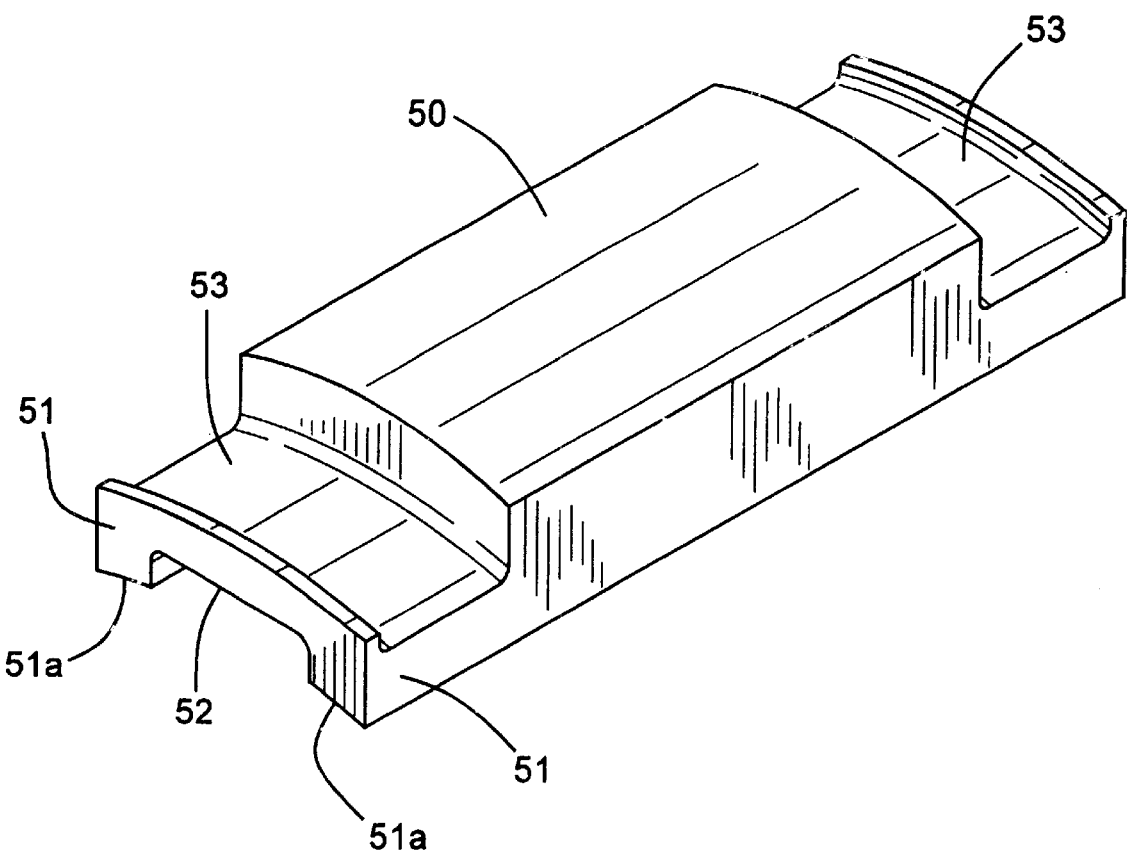
FIG. 3 is an enlarged perspective view of a further portion of the fixture illustrated in FIG. 1.

The structure of the fixture 30 is illustrated in more detail in FIGS. 2 and 3. As shown in FIG. 2, the fixture 30 includes a base 31 that is adapted to be supported on the outer surface of the driveshaft tube 18. To accomplish this, the base 31 includes a pair of spaced apart feet 32 having respective inner surfaces 32a that engage the outer surface of the driveshaft tube 18. If desired, the inner surfaces 32a of the feet 32 may be concavely curved, preferably in accordance with the radius of convex curvature of the outer surface of the driveshaft tube 18. However, the inner surfaces 32a of the feet 32 may be formed having a planar or any other desired shape, configuration, or orientation. The spaced apart feet 32 define a recessed area 33 in the bottom surface of the base 31.

In the illustrated embodiment, the feet 32 extend longitudinally along the entire length of the base 31, although such is not necessary. The circumferential widths of the feet 32 are preferably equal to one another and are preferably relatively small in comparison to the circumferential width of the recessed area 33 in the bottom surface of the base 31. This relationship facilitates the use of a single sized base 31 on variety of driveshaft tubes 18 and other articles of varying diameter. The two feet 32 can securely engage the outer surface of the driveshaft tube 18, regardless of the size of the outer diameter thereof, because the recessed area 33 can receive, and thereby accommodate, portions of the driveshaft tube 18 therein regardless of the radius of curvature thereof. However, the circumferential widths of the feet 32 need not be equal and may have any desired relationship relative to the circumferential width of the recessed area 33 in the bottom surface of the base 31.

An enclosure area 34 is provided in the base 31 of the mounting fixture 30. In the illustrated embodiment, the enclosure area 34 is a generally rectangularly shaped recessed area that is formed in the outer surface of an enlarged thickness central portion of the base 31. However, the enclosure area 34 may be provided in any desired portion of the base 31 and may have any desired shape, configuration, or orientation. In the illustrated embodiment, the outer surface of the base 31 is formed having a groove 34a that surrounds, at least in part, the enclosure area 34, although such is not necessary. If desired, one or more portions of the outer surface of the base 31 surrounding the enclosure area 34 may be recessed or otherwise removed, such as shown at 34b. The purposes for the enclosure area 34, the groove 34a, and the recesses 34b will be explained below.

The fixture 30 further includes a structure for mounting or otherwise securing the base 31 to the driveshaft tube 18. In the illustrated embodiment, the mounting structure includes a pair of end portions that extend longitudinally from the opposite ends of the enlarged central portion of the base 31. The end portions of the base 31 have respective grooves 35 formed therein, although such is not required. The illustrated grooves 35 extend generally perpendicularly relative to the longitudinally extending feet 32 of the base 31 and generally circumferentially relative to the driveshaft tube 18. The grooves 35 are adapted to receive portions of respective band clamps 36 (see FIG. 1) or other retaining structures therein. The band clamps 36 are conventional in the art and are adapted to be disposed and tightened about the end portions of the base 31 and the driveshaft tube 18 so as to secure the sensing device 30 thereto. The grooves 35 are provided to insure that the band clamps 36 are positively retained on the end portions of the base 31.

The fixture 30 further includes a lid 37 that cooperates with the base 31 to provide a protective enclosure for the enclosed area 34. As best shown in FIG. 2, the illustrated lid 37 is generally rectangular and planar in shape, and is sized to fit over the enclosed area 34 and be selectively secured to the base 31. However, the lid 37 may be formed having any desired shape, configuration, or orientation. In the illustrated embodiment, the inner surface of the lid 37 is formed having a groove (not shown) that surrounds, at least in part, the enclosure area 34 when the lid 37 is secured to the base 31, although such is not necessary. Preferably, the groove formed in the inner surface of the lid 37 corresponds in size and location with the groove 34a formed in the base 31. Also if desired, one or more portions of the lid 37 may be recessed or otherwise removed, such as shown at 37a. Preferably, the recesses 37a provided on the lid 37 are disposed adjacent to the recesses 34a formed in the base 31 when the lid 37 is secured to the base 31 as shown in FIG. 1, although such is not required. The purposes for the groove and the recesses 37a in the lid 37 will also be explained below.

A structure is provided for positively retaining the lid 37 on the base 31 to provide a protective enclosure for the enclosed area 34. In the illustrated embodiment, this retaining structure includes a plurality of threaded bores 31a that are formed in the base 31 and a second plurality of apertures 37b that are formed in the lid 37. The apertures 37b formed through the lid 37 are preferably aligned with the threaded bores 31a formed in the base 31 when the lid 37 cooperates with the base 31 as shown in FIG. 1. A plurality of threaded fasteners (not shown) can extend through the apertures 37b formed through the lid 37 into engagement with the threaded bores 31a formed in the base 31 to positively retain the lid 37 on the base 31. However, it will be appreciated that the lid 37 can be retained on the base 31 by any other desired retaining structure.

If desired, a seal 38 can be provided between the lid 37 and the base 31 to prevent dirt, water, and other contaminants from entering into the enclosed area 34 when the lid 37 cooperates with the base 31. In the illustrated embodiment, the seal 38 is embodied as a flexible elastomeric O-ring or similar structure that is sized to be received in the recess 34b formed in the outer surface of the base 31 and in the cooperating recess formed in the inner surface of the lid 37. Thus, when the lid 37 is secured to the base 31 by the threaded fasteners as described above, the elastomeric seal 38 is compressed therebetween to provide a seal therebetween that prevents dirt, water, and other contaminants from entering into the enclosed area 34.

A sensing device 40 is adapted to be disposed within the enclosed area 34 between the base 31 and the lid 37. The illustrated sensing device 40 is a conventional telemetry device that is adapted to receive electrical signals through a plurality of electrical conductors 41 from one or more sensors (not shown) that are mounted on or otherwise connected to the driveshaft tube 18 and to transmit such signals to a remote controller (not shown) for storage and/or analysis. However, the illustrated sensing device 40 is intended to be representative of any device, or any portion of such a device, that can be used to sense one or more operating characteristics of the driveshaft tube 18 or other article as it is rotated or otherwise moved during use.

The sensing device 40 is preferably sized to be received within the enclosed area 34 of the base 31 and protectively covered by the lid 37 when the lid 37 is secured to the base 31. The recesses 34b formed in the base 31 cooperate with the recesses 37a formed in the lid 37 to provide openings in the fixture 30 through which the wires 41 of the sensing device 40 may pass from within the enclosed area 34 to the sensors provided on the driveshaft tube 18. Such wires 41 are resiliently engaged by the seal 38 in the manner described above to prevent dirt, water, and other contaminants from entering into the enclosed area 34 when the lid 37 is secured to the base 31.

The fixture 30 further includes a counterweight 50 that is adapted to be supported on the outer surface of the driveshaft tube 18 opposite to the base 31. Similar to the base 31, the counterweight 50 includes a pair of spaced apart feet 51 having respective inner surfaces 51a that engage the outer surface of the driveshaft tube 18. If desired, the inner surfaces 51a of the feet 51 may be concavely curved, preferably in accordance with the radius of convex curvature of the outer surface of the driveshaft tube 18. However, the inner surfaces 51a of the feet 51 may be formed having a planar or any other desired shape, configuration, or orientation. The spaced apart feet 51 defined a recessed area 52 in the bottom surface of the counterweight 50.

In the illustrated embodiment, the feet 51 extend longitudinally along the entire length of the counterweight 50, although such is not necessary. The circumferential widths of the feet 51 are preferably equal to one another and are preferably relatively small in comparison to the circumferential width of the recessed area 51a in the bottom surface of the counterweight 50. This relationship facilitates the use of a single sized counterweight 50 on variety of driveshaft tubes 18 and other articles of varying diameter. The two feet 51 can securely engage the outer surface of the driveshaft tube 18, regardless of the size of the outer diameter thereof, because the recessed area 51a can receive, and thereby accommodate, portions of the driveshaft tube 18 therein regardless of the radius of curvature thereof. However, the circumferential widths of the feet 51 need not be equal and may have any desired relationship relative to the circumferential width of the recessed area 52 in the bottom surface of the counterweight 50.

The fixture 30 further includes a structure for mounting or otherwise securing the counterweight 50 to the driveshaft tube 18. In the illustrated embodiment, the mounting structure includes a pair of end portions that extend longitudinally from the opposite ends of an enlarged central portion of the counterweight 50. The end portions of the counterweight 50 have respective grooves 53 formed therein, although such is not required. The illustrated grooves 53 extend generally perpendicularly relative to the longitudinally extending feet 51 of the counterweight 50 and generally circumferentially relative to the driveshaft tube 18. The grooves 53 are adapted to receive portions of the above-described band clamps 36 (see FIG. 1) or other retaining structures therein to insure that the band clamps 36 are positively retained on the end portions of the base 31.

Preferably, the weight of the counterweight 50 is similar to the combined weight of the base 31, the lid 37, and the sensing device 40, although such is not necessary. When so weighted, however, the counterweight 50 reduces or eliminates any rotational imbalance in the driveshaft tube 18 that would otherwise occur if only the base 31, the lid 37, and the sensing device 40 were secured thereto.

As an alternative to the illustrated embodiment, it will be appreciated that the end portions of the base 31 and the counterweight may be omitted, and that one or more band clamps 36 may be disposed and tightened about the central portions of the base 31 and the counterweight 50 to retain them on the driveshaft tube 18. This structure may be advantageous because the band clamp 36 can retain the lid 37 on the base 31 without the need for separate threaded fasteners.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A fixture for supporting a sensing device on a movable article, said fixture comprising:
    a base including a first surface that is adapted to engage the article and a second surface having an enclosure area formed therein that is adapted to receive the sensing device;
    a lid secured to said base and extending over said enclosure area to retain the sensing device therein;
    a counterweight adapted to engage the article opposite said base; and
    a retaining structure for securing said base and said counterweight to the article for rotation therewith.

2. The fixture defined in claim 1 wherein said first surface of said base includes a pair of spaced apart feet that define a recessed area therebetween.

3. The fixture defined in claim 1 wherein said feet extend along the entire length of said base.

4. The fixture defined in claim 1 wherein said feet define respective widths that are smaller that a width defined by said recessed area.

5. The fixture defined in claim 1 wherein said feet define respective widths that are equal.

6. The fixture defined in claim 1 wherein said feet having inner surfaces that are curved.

7. The fixture defined in claim 1 wherein said base includes an enlarged central portion having an end portion extending therefrom.

8. The fixture defined in claim 7 wherein said retaining structure engages said end portion of said base for securing said base and said counterweight to the article for rotation therewith.

9. The fixture defined in claim 8 wherein said retaining structure includes a band clamp.

10. The fixture defined in claim 7 wherein said end portion has a groove formed therein, and wherein said retaining structure is received within said groove for securing said base and said counterweight to the article for rotation therewith.

11. The fixture defined in claim 1 wherein said base includes an enlarged central portion having a pair of end portions extending therefrom.

12. The fixture defined in claim 11 wherein said retaining structure engages each of said end portions of said base for securing said base and said counterweight to the article for rotation therewith.

13. The fixture defined in claim 12 wherein said retaining structure includes a pair of band clamps.

14. The fixture defined in claim 11 wherein each of said end portions has a groove formed therein, and wherein said retaining structure is received within each of said grooves for securing said base and said counterweight to the article for rotation therewith.

15. The fixture defined in claim 1 wherein said counterweight includes a surface that is adapted to engage the article opposite said base, said counterweight surface having a pair of spaced apart feet that define a recessed area therebetween.

16. The fixture defined in claim 15 wherein said feet extend along the entire length of said counterweight.

17. The fixture defined in claim 15 wherein said feet define respective widths that are smaller that a width defined by said recessed area.

18. The fixture defined in claim 15 wherein said feet define respective widths that are equal.

19. The fixture defined in claim 15 wherein said feet having inner surfaces that are curved.

20. The fixture defined in claim 1 wherein said counterweight includes an enlarged central portion having an end portion extending therefrom.

21. The fixture defined in claim 20 wherein said retaining structure engages said end portion of said counterweight for securing said base and said counterweight to the article for rotation therewith.

22. The fixture defined in claim 21 wherein said retaining structure includes a band clamp.

23. The fixture defined in claim 20 wherein said end portion has a groove formed therein, and wherein said retaining structure is received within said groove for securing said base and said counterweight to the article for rotation therewith.

24. The fixture defined in claim 1 wherein said counterweight includes an enlarged central portion having a pair of end portions extending therefrom.

25. The fixture defined in claim 24 wherein said retaining structure engages each of said end portions of said counterweight for securing said base and said counterweight to the article for rotation therewith.

26. The fixture defined in claim 25 wherein said retaining structure includes a pair of band clamps.

27. The fixture defined in claim 24 wherein each of said end portions has a groove formed therein, and wherein said retaining structure is received within each of said grooves for securing said base and said counterweight to the article for rotation therewith.

28. The fixture defined in claim 1 wherein said base includes an enlarged central portion having a pair of end portions extending therefrom and said counterweight includes an enlarged central portion having a pair of end portions extending therefrom.

29. The fixture defined in claim 28 wherein said retaining structure engages each of said end portions of said base and each of said end portions of said counterweight for securing said base and said counterweight to the article for rotation therewith.

30. The fixture defined in claim 29 wherein said retaining structure includes a pair of band clamps.

31. The fixture defined in claim 28 wherein each of said end portions of said base and each of said end portions of said counterweight has a groove formed therein, and wherein said retaining structure is received within each of said grooves for securing said base and said counterweight to the article for rotation therewith.

* * * * *